US 6,738,127 B1

(12) United States Patent
Roddy et al.

(10) Patent No.: US 6,738,127 B1
(45) Date of Patent: May 18, 2004

(54) LCD-BASED PRINTING APPARATUS FOR PRINTING ONTO HIGH CONTRAST PHOTOSENSITIVE MEDIUM

(75) Inventors: James E. Roddy, Rochester, NY (US); Robert J. Zolla, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 10/422,103

(22) Filed: Apr. 24, 2003

(51) Int. Cl.[7] .................. G03B 27/52; G03B 27/72; G02B 5/12
(52) U.S. Cl. .................. 355/40; 355/32; 355/35; 358/519
(58) Field of Search .................. 359/487, 474, 359/506, 519; 355/40, 32, 35, 77

(56) References Cited

U.S. PATENT DOCUMENTS

| | | | |
|---|---|---|---|
| 6,122,103 A | * | 9/2000 | Perkins et al. |
| 6,163,363 A | * | 12/2000 | Nelson et al. |
| 6,215,547 B1 | * | 4/2001 | Ramanujan et al. ......... 355/67 |
| 6,243,199 B1 | * | 6/2001 | Hansen et al. |
| 6,288,840 B1 | * | 9/2001 | Perkins et al. |
| 6,480,259 B1 | * | 11/2002 | Wong et al. |
| 6,624,949 B2 | * | 9/2003 | Roddy et al. ............... 359/634 |
| 6,626,539 B2 | * | 9/2003 | van Gelder et al. ........... 353/20 |
| 6,636,292 B2 | * | 10/2003 | Roddy et al. ................ 355/32 |

* cited by examiner

Primary Examiner—Russell Adams
Assistant Examiner—D. Ben Esplin
(74) Attorney, Agent, or Firm—Nelson Adrian Blish

(57) ABSTRACT

A printing apparatus (110) for selectively printing an image from image data either onto any member of a set of photosensitive media (140), including a first photosensitive medium (140) having a relatively low contrast response and a second photosensitive medium (140) having a relatively high contrast response. The printing apparatus (110) uses a spatial light modulator (136) for forming an image, having at least a first set of setup voltage conditions for printing onto the first photosensitive medium (140) and a second set of setup voltage conditions for printing onto the second photosensitive medium (140). An adjustable polarizing component in the path of output light from the spatial light modulator (136), has at least a first contrast setting for the first photosensitive medium (140) and a second contrast setting for the second photosensitive medium (140). A control logic processor (112) selectively sets at least either said first set of setup voltage conditions or said second set of setup voltage conditions for the photosensitive medium (140).

47 Claims, 9 Drawing Sheets

LCD-BASED PRINTING APPARATUS FOR PRINTING ONTO HIGH CONTRAST PHOTOSENSITIVE MEDIUM

FIELD OF THE INVENTION

This invention generally relates to printing apparatus for photosensitive media and more particularly relates to a printing apparatus and method for recording images onto a high contrast photosensitive medium.

BACKGROUND OF THE INVENTION

Over many years, apparatus and techniques for high-volume printing of images onto photosensitive media have been continuously refined and improved to reduce cost, boost efficiency, and maximize speed. In particular, printing of motion picture print films, distributed to theaters and other exhibitors, has benefited from this ongoing improvement process, so that today's methods for providing print films are considered by many film printing labs to be efficient and cost-effective.

It is illustrative to give a brief overview of the workflow for conventional motion picture print film manufacture, as shown in FIG. 1. The image input to the printing process at a contact printer 120 is a master negative film 122, carefully printed and prepared by a film lab as an intermediate for the printing process. Unimaged print film 124 is the material input to this process. At high rates of speed, a contact printing method is used at a printhead 126 to expose images from film master negative 122 onto unimaged print film 124, to produce a positive print on an exposed print film 124'. Exposed print film 124' is then developed, dried, and packaged for distribution to theaters and other exhibitors. In the print process itself, several hundred exposed print films 124' can be made from a single master negative film 122.

With the advent of digital imaging capabilities, it is recognized that there are opportunities for improvement in methods and apparatus used for motion picture print film manufacture. In particular, two-dimensional spatial light modulator arrays, such as liquid crystal device (LCD) arrays and digital micromirror device (DMD) arrays, have been proposed for use in various printing applications. Just a few examples of printing apparatus and methods using these devices are disclosed in U.S. Pat. No. 6,215,547 (Ramanujan et al.) which discloses the use of a reflective LCD with a 3-color LED source; U.S. Pat. No. 6,480,259 (Wong et al.) which discloses a printing apparatus using polarization modulation with added polarization components for increasing contrast ratio; and U.S. Pat. No. 6,163,363 (Nelson et al.) which discloses the use of a DMD array for providing a printing apparatus with optimized contrast ratio.

In spite of the capabilities and advantages offered by digital imaging technologies, a number of significant hurdles remain. Among the more significant obstacles is writing speed. Two-dimensional spatial light modulators do not yet provide sufficient light levels or exhibit sufficient refresh rates for use in high-speed print film preparation, making it impractical to substitute these devices in printing applications where high-speed film exposure is currently used. This is particularly important since, as can be readily appreciated, high speed apparatus used for printing onto print film represent considerable capital investment. Until digital imaging technologies can offer significant advances in speed and lower cost, conventional contact printing techniques will likely be employed for the vast bulk of print film preparation.

However, while digital technologies may still not be optimal for print film exposure, spatial light modulators are being employed in print applications for preparing the negative master, where printing speeds are not critical and where digital imaging offers other advantages. For example, U.S. Pat. No. 6,215,547 (Ramanujan et al.) teaches the use of an LCD spatial light modulator for printing an image onto photosensitive media. Using approaches such as that disclosed in U.S. Pat. No. 6,215,547, it would be possible to use LCD spatial light modulators for writing images onto an intermediate negative film. Conventional contact-printing exposure techniques would then be used for printing from this intermediate master negative to the print film.

It is well recognized in the imaging arts that some amount of image degradation is inevitable with each intermediate stage. Thus, for example, even when printing from a negative of the highest quality, with a contact printer having ideal exposure levels and timing, some loss of image quality at the print film is inevitable. Typically, for example, there is some small amount of motion between the negative and the print in a contact printer, resulting in some loss of sharpness. Additionally, stray light in the printing process can contribute to some loss of contrast. Thus, it follows that, even with the relatively good performance of high-quality contact printers, there are advantages for image quality in eliminating an intermediate stage. Writing directly to print film, without the use of an intermediate master negative, would have inherent value for improved image quality. Even though it may take more time to write directly to print film, as compared with imaging by contact printing, there can be compelling reasons for providing print films having exceptionally high quality. For example, select motion picture theaters could charge a premium for showing a first run film having very high image quality, in comparison with most other theaters that project from print film prepared in the conventional manner.

Thus, it can be seen that there is a perceived need for being able to print directly to print film, using digital imaging techniques, even if this process is more time consuming than the conventional high-volume process. One alternative is to provide a printing apparatus expressly for this purpose, able to accept print film and to image directly onto the print film, without any intermediate negative stage. However, this first alternative would likely prove too costly for commercial use. Another alternative would be to begin with an existing printer designed for digital printing of master negative film media, and adapt such a printer to the additional task of imaging directly onto print film. A printer of this type could then be operated either to print a master negative or to print onto print film.

Adapting a printer for writing directly to print film presents a number of significant challenges, however. A first challenge is due to differences in media response. Referring to FIG. 2, there is shown a density versus log exposure curve for a typical intermediate negative film medium, such as would be conventionally used for master negative film 122 in FIG. 1. Referring to FIG. 3, on the same scale as FIG. 2, there is shown a density versus log exposure curve for a typical print film, such as would be conventionally used as a contact print film 124 in FIG. 1. Comparing FIGS. 2 and 3, it can be appreciated that there is significant difference in response between negative film and print film. The negative film can be characterized as a low contrast film. Print film, meanwhile, is characterized as a high contrast film. The slope of the D log E curve shows the relative gamma, or contrast characteristic, of the film medium. In terms of contrast, the negative film, as shown in FIG. 2, exhibits much lower contrast than the print film, as shown in FIG. 3. For example, a typical intermediate negative film has a gamma of about 1.0. By comparison, a typical print film has a gamma of nearly 5.0 at the point of steepest slope.

The photosensitive media of FIGS. 2 and 3 differ significantly in terms of dynamic range. Briefly, dynamic range for a photosensitive medium is based on the difference between the brightest and dimmest regions of exposure. The dynamic range of the light exposure required for the negative medium represented in FIG. 2 is relatively high, on the order of 708:1. That is, the brightest exposure must be about 700 times greater than the dimmest exposure in order to produce a negative with a density range from zero to slightly over 2.0. For the print medium of FIG. 3, however, the dynamic range of required light exposure is relatively low, at approximately 89:1. The steeper slope (gamma) of the D log E curve for the print medium of FIG. 3 means that a much smaller ratio of exposure light levels is needed to span the density range from minimum to maximum.

Because of the difference in dynamic range for the two photosensitive media of FIGS. 2 and 3, it would not be suitable to simply substitute one medium for the other in a printing apparatus. For example, with mere substitution of the media of FIG. 3 into a writer set up for the media of FIG. 2, only a small range of digital values spans the difference in density from 0 density to maximum density (Dmax). Since a small difference in code value and log exposure value results in a large difference in density, image contouring effects, therefore, are much more likely with the high contrast media of FIG. 3.

Labeling of the x-axis in FIGS. 2 and 3 shows how code value would map to density if a typical printer calibration look-up table (LUT) were created. In FIG. 2, the code values are spread across a significant extent of the log exposure region, where the curve is essentially linear. Using a conventionally generated calibration LUT, FIG. 3 shows how input code values spread over the same exposure range would map to output densities on the print film. In FIG. 3, the lower code values and some of the upper code values are mapped to flat areas of the curve, so that large changes in code value in these ranges produce little change in density. With the response of FIG. 3, code values in these flat areas are effectively lost, leaving only the remaining code values to cover the entire dynamic range of the film medium. A printing apparatus handling this type of media must be configured for a reduced exposure range, re-mapping code values in the input image data to code values for the reduced exposure range of the imaging medium. That is, code values must be redistributed over the useful density range of the film. If code values are not suitably redistributed, it is possible to cause contouring artifacts in the image. Contouring occurs when a single increment in code value causes a corresponding density change that exceeds the threshold of visual perception. Visible density contours in an image produce an unwanted effect analogous to contour lines on a weather map.

Conventional negative/positive film systems purposely employ high and low contrast films. A low contrast film (having a gamma of approximately 0.6–0.7) is used to capture the original scene. By utilizing a low contrast film for this function, a wide scene dynamic range is recorded. Also, a low contrast film is more tolerant of small exposure errors, allowing correction to be made during the printing stages without severely altering overall tone reproduction. Intermediate film, with a gamma close to 1.0 is used to produce intermediate positive and negative copies of the camera negative. The gamma of 1.0 prevents contrast build up during the numerous duplication stages of motion picture production. Print film, then, is a high contrast film. The high contrast is necessary to produce an overall tone reproduction that is pleasing when viewed in a darkened theater. The full system contrast is the product of the gamma of all of the stages of production. The system contrast is slightly greater than 1.0 to compensate for the eye's diminished contrast perception when viewing a scene in a darkened room. Developed over many decades, this elegant system works remarkably well. It is particularly instructive to observe that this conventional method employs a combination of low- and high-contrast media, where desirable characteristics of both low- and high-contrast media are utilized at different points in the workflow and are harmonized in order to provide a pleasing visual output. It is not surprising that interposing digital printing into this conventional workflow is not "seamless" and can introduce problems with tone reproduction and image artifacts.

The difference in contrast illustrated in FIGS. 2 and 3 means that print film media accentuates artifacts when compared with negative media. For example, print film tends to accentuate LCD image artifacts such as non-uniformity and defective or marginal pixels, which may not be as readily apparent on the negative film medium alone. In the case of the films of FIGS. 2 and 3, print film can accentuate perceptible artifacts by a factor as high as 4 to 5. Therefore, there is a need to compensate for high contrast response when a printing apparatus is used for direct printing to a print film.

It is known in the imaging arts to use a look-up table (LUT) to compensate for non-linearities introduced by a photosensitive medium or by light modulation components such as acousto-optic modulators or liquid crystal devices. The LUT provides a flexible mechanism, allowing modification for media or modulation device differences and is often used for calibration purposes.

One method for calibrating a printing apparatus to the response characteristics of a photosensitive medium is by adjusting the mapping of digital data, creating a LUT to correlate input data values to output exposure levels, such as is described in commonly-assigned U.S. patent application Ser. No. 10/000,967, filed Nov. 2, 2001, entitled "Calibration Method for a Printing Apparatus Using Photosensitive Media" by James Erwin and William Miller. Using the method of U.S. patent application Ser. No. 10/000,967, input code values are mapped to device code values by correlating exposure energy values to density throughout the range of possible input data values, at a given bias voltage level. While this method is useful for calibration, particularly where the resolution of a light modulator has higher resolution than the input data, U.S. patent application Ser. No. 10/000,967 does not address uniformity problems that can be perceptible when changing between low- and high-contrast media. For this reason, in addition to data value mapping using LUTs, contrast response characteristics of photosensitive print film may require additional adjustment of printing hardware.

Thus, it can be seen that there is a need for a printing apparatus and suitable method for adapting a printing apparatus to photosensitive media having different contrast response characteristics.

SUMMARY OF THE INVENTION

It is an object of the present invention to provide a printing apparatus and method for adapting a printing apparatus suited to printing onto a plurality of types of photosensitive medium, differentiated by contrast response. With this object in mind, the present invention provides a printing apparatus for selectively printing an image from image data onto any member of a set of photosensitive media, wherein the set comprises at least a first photosensitive medium and a second photosensitive medium, wherein the first photosensitive medium has a relatively low contrast response with respect to the second photosensitive medium, the apparatus comprising:

(a) a spatial light modulator for forming an image by modulating a polarization state of an incident light according to the image data, the spatial light modulator having at least a first set of setup voltage conditions for printing onto the first photosensitive medium and a second set of setup voltage conditions for printing onto the second photosensitive medium;

(b) an adjustable polarizing component in the path of output light from the spatial light modulator, the adjustable polarizing component having at least a first contrast setting for the first photosensitive medium and a second contrast setting for the second photosensitive medium; and (c) a control logic processor for selectively setting at least the first set of setup voltage conditions for the first photosensitive medium and the second set of setup voltage conditions for the second photosensitive medium.

From another aspect, the present invention provides a method for printing an image from image data onto a photosensitive medium having a predetermined contrast response, comprising:

(a) setting voltage conditions for a spatial light modulator, based on the contrast response of the photosensitive medium;

(b) adjusting polarization components to reduce the contrast of imaging optics according to the contrast response of the photosensitive medium;

(c) directing an incident light having a predetermined polarization state toward a spatial light modulator;

(d) modulating the incident light according to the image data in order to form a modulated image-bearing beam; and (e) directing the modulated image-bearing beam toward the photosensitive medium.

A feature of the present invention is the use of adjustable polarization components for adjusting contrast in a printing apparatus.

It is an advantage of the present invention that it allows a single printer to be readily adapted to print onto different photosensitive media having a range of contrast response characteristics. Using the method of the present invention, a printer could be adjusted to accommodate two or more different media types, each media type having specific setup parameters. In a particular case, the same printer used for imaging onto a negative film medium could be used to image directly onto a positive film medium, effectively eliminating a step in film reproduction processing.

It is a further advantage of the present invention that it allows adjustment for providing improved uniformity on a high contrast medium.

These and other objects, features, and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

While the specification concludes with claims particularly pointing out and distinctly claiming the subject matter of the present invention, it is believed that the invention will be better understood from the following description when taken in conjunction with the accompanying drawings, wherein:

DETAILED DESCRIPTION OF THE INVENTION

The present description is directed in particular to elements forming part of, or cooperating more directly with, apparatus in accordance with the invention. It is to be understood that elements not specifically shown or described may take various forms well known to those skilled in the art.

EO Device Response

Figure 4:
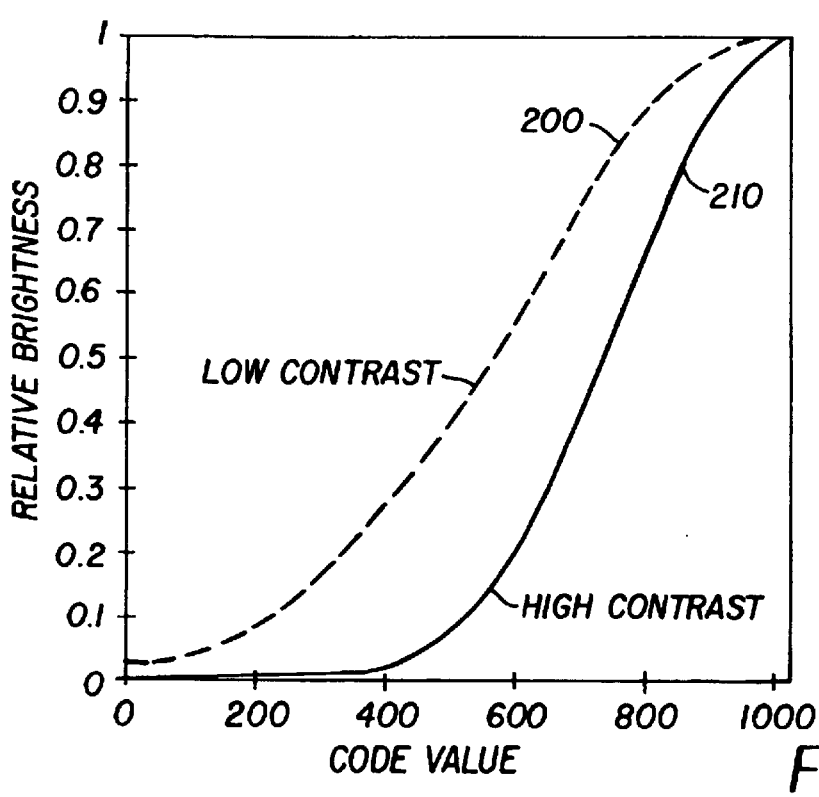
FIG. 4 shows comparative EO device response curves for both low and high contrast setup.

Referring to FIG. 4, there are shown two characteristic electro-optical (EO) curves for the same LCD spatial light modulator device that relate relative brightness to a code value. Voltage setup parameters Vc, V1 and V2, used to control device EO response, are different for the two curves, a low contrast curve 200 and a high contrast curve 210. The vertical axis is the relative brightness or "reflectivity" of the device. The horizontal axis corresponds to the digital code value of a pixel and is proportional to the video drive voltage applied to that pixel in the LCD. The higher the video voltage applied (higher digital code values) the higher the amounted of light "reflected" from that pixel or region. The response in light reflection applies for both low and high contrast curves 200 and 210. The slopes of low and high contrast curves 200 and 210 show the variability of an electro-optical device response with setup voltage conditions. Low contrast curve 200 shows how increasing code values increase brightness at a gradual rate. High contrast curve 210 shows a steeper increase in brightness between code values over most of the range of code values. In addition, high contrast curve 210 achieves a lower relative brightness for low code values than does low contrast curve 200. Significantly, low contrast curve 200 exhibits a more uniform spacing of brightness levels over the code values than is available from high contrast curve 210. It can be appreciated that there are advantages to providing as many discrete exposure levels as possible, in order to minimize contouring in an exposed image. This is particularly true where a photosensitive medium has a high contrast response.

Figure 1:
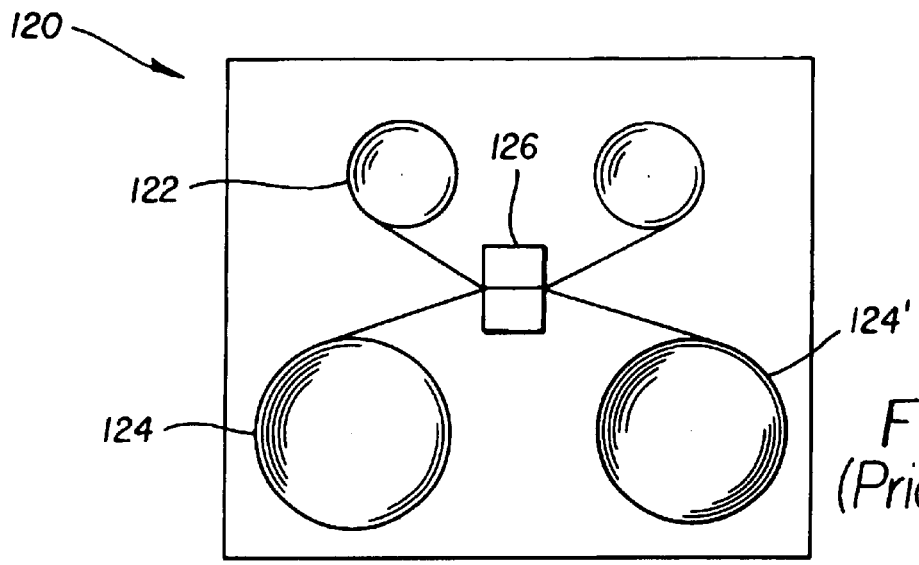
FIG. 1 is a block diagram showing the basic function of a prior art contact printer for imaging to print film.
Figure 2:
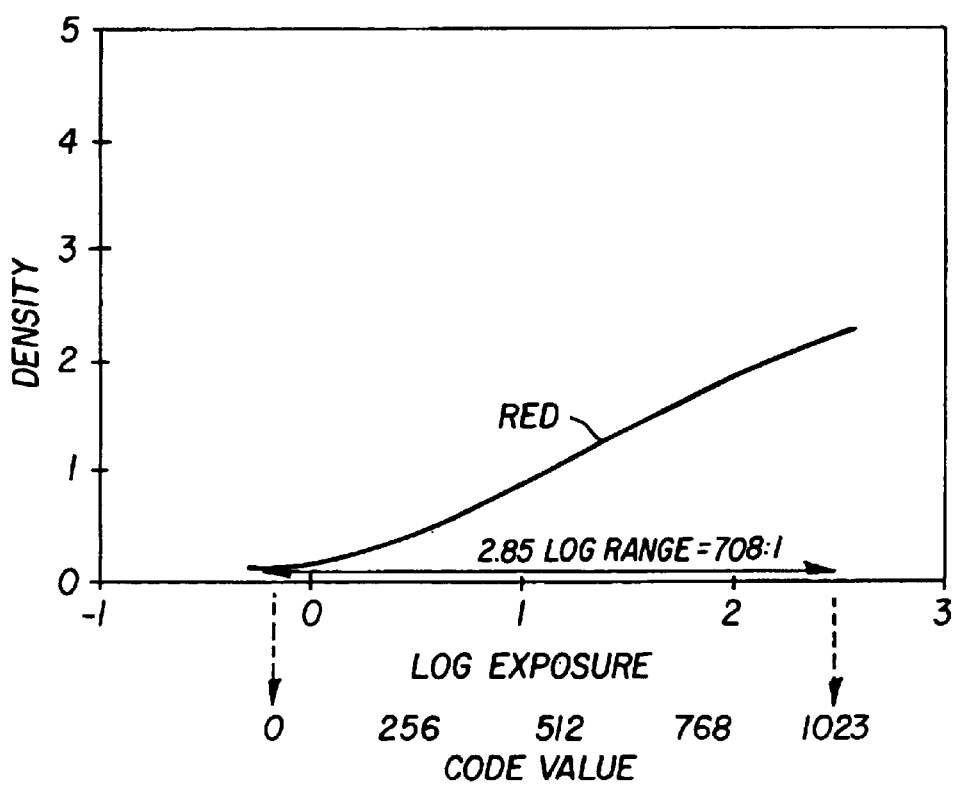
FIG. 2 is a graph showing density versus log exposure for a typical intermediate negative film medium.

For the intermediate negative film having the response characteristic of FIG. 2, having high contrast in the exposing image is of particular importance. With this goal in mind, the LCD spatial light modulator device is typically set up for the response of high contrast curve 210, to provide a high contrast light exposure to the film. This high contrast setup is necessary to provide the required wide range of exposures to the film, especially at very low brightness levels. Such an arrangement may not offer the optimum distribution of code values relative to light levels. However, acceptable performance is obtained by mapping every input code value to a unique output value in the calibration look-up table (LUT). By doing this, contouring is not introduced into the digital data itself. The optical system is likewise carefully adjusted to provide the best possible contrast, as is discussed in detail subsequently. For a high contrast film like that of FIG. 3, it is desirable to have as many digital code values on the region of high slope as possible, as would be provided when using the low contrast curve 200. Otherwise, if high contrast curve 210 were used instead, every unit increment in code value would cause large changes in light level. Consequently, large changes in density would result, causing objectionable contouring in the image. With this consideration, then, it can be seen that a low contrast medium needs a high contrast exposure light input and a high contrast medium needs a low contrast exposure light input. This relationship applies to the conventional print film preparation workflow described hereinabove with reference to FIG. 1.

Figure 3:
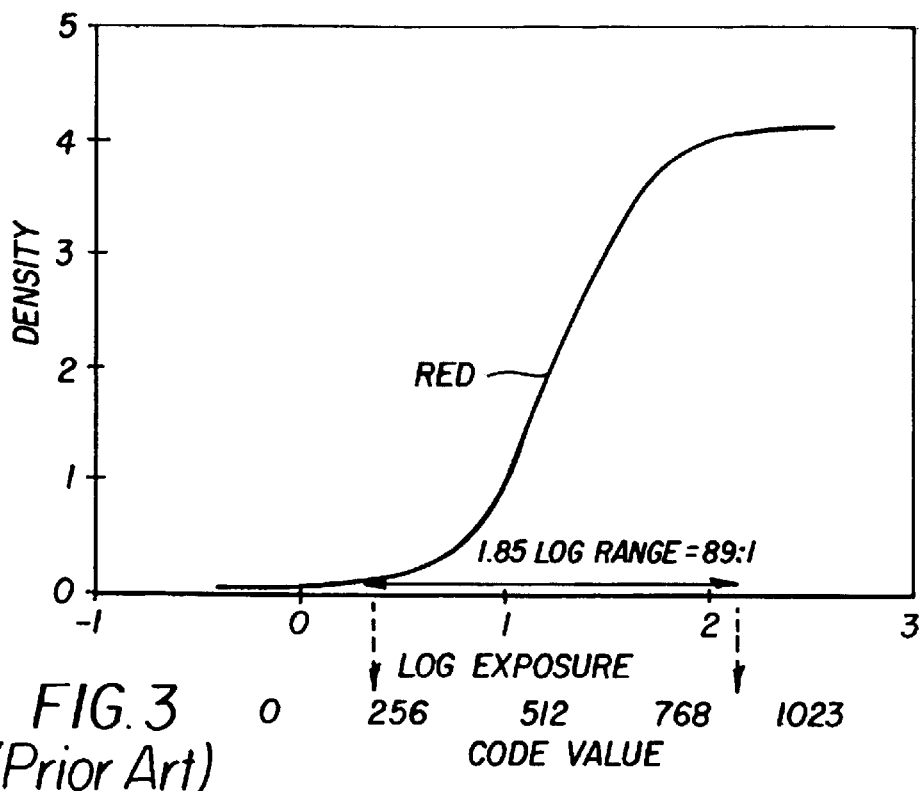
FIG. 3 is a graph showing density versus log exposure for a typical print film medium.

Referring to FIG. 3, the range of code values needs to be limited to the smaller exposure range indicated by the dotted-line arrows pointing to the code value range, such that changes in code value, throughout the range of code values, produce correspondingly small changes in density. This adjustment is accomplished by setting up the LCD spatial light modulator with low contrast curve 200 of FIG. 4.

It is instructive to observe how a change in bias voltages (that is, in LCD voltage setup parameters) affects the EO curve contrast. Referring now to the curves of FIG. 5*a* and 5*b*, there are shown, for comparison, typical relationships of relative drive voltage levels to relative brightness for an electro-optical exposure device such as an analog reflective LCD. Voltage Vc is the control voltage or backplane voltage of the LCD. Voltage V1 controls the offset pedestal from Vc and has a corresponding complementary negative voltage V2 (not shown), applied to the LCD during alternate half cycles. Voltages V1 and V2 have essentially the same magnitude, but are opposite in polarity with respect to Vc. (Alternating polarity keeps the device from building up a space charge which would dramatically shorten component life). Voltages V1 and V2 otherwise have identical function; the description that follows uses V1 and describes the positive half cycle for convenience. Using drive voltages that are within the pedestal region of this curve in FIG. 5*a*, there is very little increase in brightness.

Figure 5A:
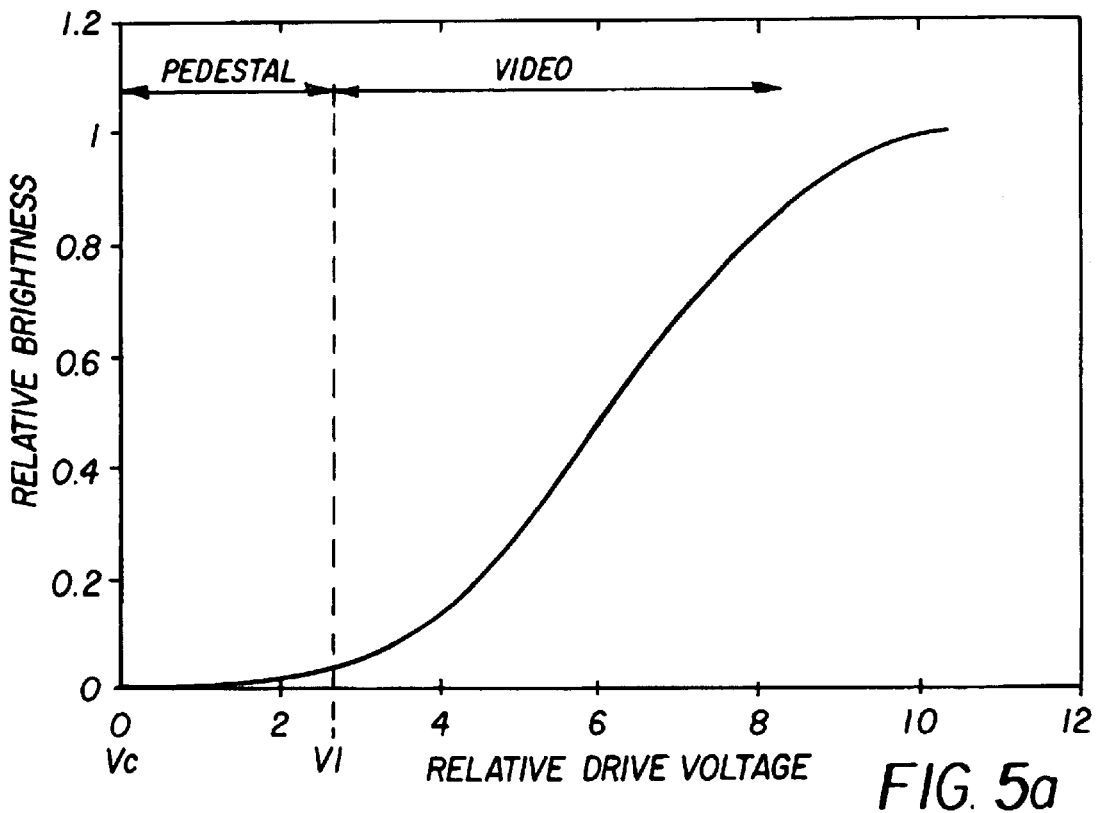
FIG. 5a shows a typical characteristic brightness response for a given range of drive voltages, with voltage setup for high contrast.
Figure 5B:
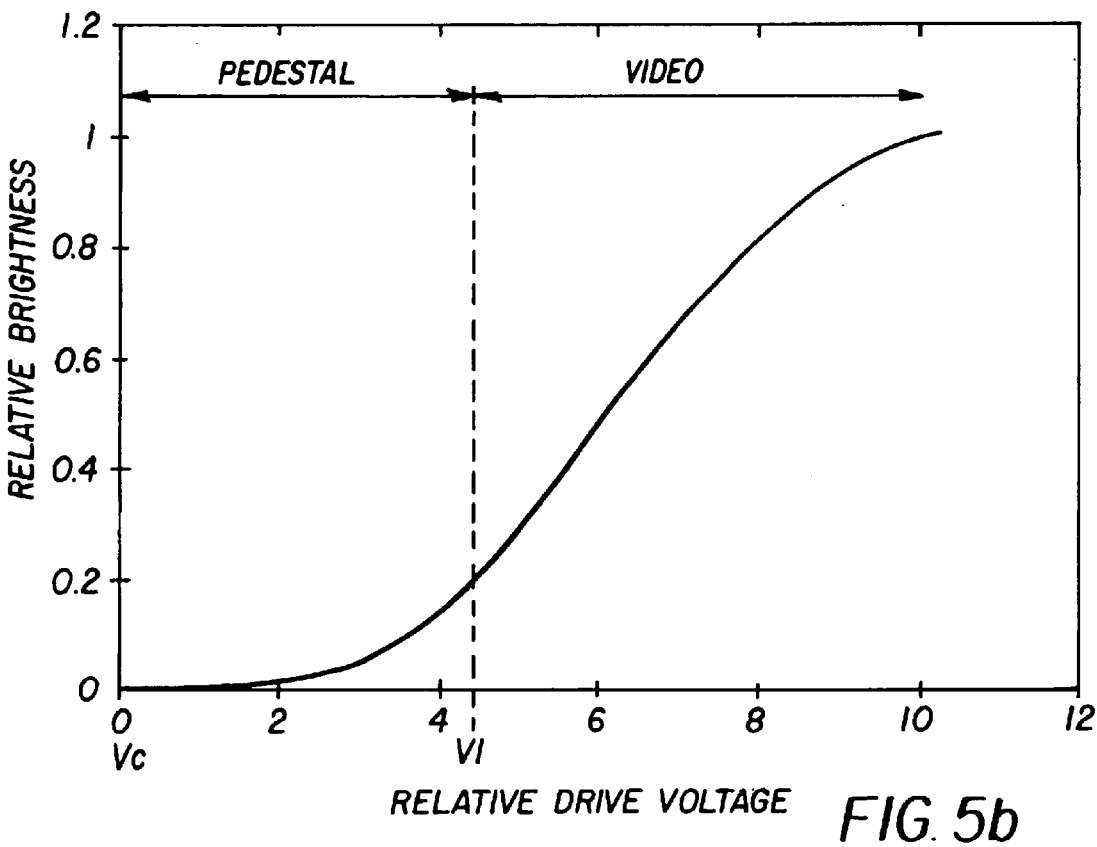
FIG. 5b shows a typical characteristic brightness response for a given range of drive voltages, with voltage setup for low contrast.

Still referring to FIGS. 5*a* and 5*b*, overall contrast is varied by raising or lowering voltage level V1. The brightness levels available for an image are controlled by the video voltage, above the pedestal voltage and exceeding V1, which can vary over the range shown. This video voltage, then, is proportional to the digital code value. The peak video voltage is one of the setup voltage parameters, but is typically limited in range. The video voltage may or may not be able to address the full device reflectivity range, depending upon color. As is represented in FIG. 5*a* or 5*b*, the pedestal voltage, set by V1, can effectively shift the overall video range up and down the curve. Voltage V1 should be small, as in FIG. 5*a* to create high contrast curve 210 of FIG. 4. Contrast, being a ratio, is a strong function of the low level, the denominator, and a weaker function of the high level, the numerator. A small V1 voltage level gives a low relative brightness for zero video volts above the pedestal V1. In addition, since the video voltage is limited, the maximum video voltage may not provide the full possible brightness. V1 must be larger, as shown in FIG. 5*b*, to obtain the lower contrast curve 200 of FIG. 4. In the case of a larger voltage V1, both the low end of the video and the higher end of the video slide farther up the curve, as is shown in FIG. 5*b*. As a result, the low end and the high end have higher brightness values than in the case with a small voltage V1, FIG. 5*a*. The contrast is lower, because contrast is a ratio primarily controlled by the low end value, as is noted hereinabove. Low and high contrast curves 200 and 210 of FIG. 4 correspond to the two curves from FIGS. 5*a* and 5*b*, respectively, having different V1 values, however. For comparison, the curves in FIGS. 5*a* and 5*b* are normalized before being plotted in the form used in FIG. 4. In setup of the LCD, adjustment of pedestal voltage V1 determines the overall electro-optical brightness response characteristic, once Vc has been determined. It is instructive to observe that the video drive level is set to achieve as close to maximum brightness as possible without going over the top of the EO curve. As is well known to those skilled in the use of EO devices, an EO curve can actually peak and then drop as drive voltage continues to increase (an undesirable condition, not shown in FIGS. 5*a* and 5*b*).

The curves of FIGS. 4, 5*a* and 5*b* have been generated by adjusting the setup voltages of the LCD modulator, while leaving the rest of the optical system untouched. The optical system itself is set up for maximum contrast of the optics, having crossed polarizers, optimum beamsplitter alignment, and allowing minimum flare and leakage light. As has been emphasized hereinabove, a design goal for control of print density is to get the best distribution of code values over the available light levels, in order to avoid contouring.

Minimizing contouring and other quantization effects is acknowledged to be one key requirement for adapting a printing apparatus for selectable use with low and high contrast media. As the above description indicates, setting suitable voltage values for V1 and V2 and use of suitable LUT mapping can be employed in order to overcome this type of image quantization anomaly. However, there are other problems that must be solved in order to allow adaptability of a printing apparatus to low- and high-contrast media. Chief among these problems is non-uniform response of spatial light modulators. Non-uniformity is due to some variation of reflectivity over the LCD when addressed with a constant pixel value. When imaging to low-contrast intermediate negative media, non-uniformity of the spatial light modulator may not be readily apparent in the resulting image. However, when high-contrast film media is printed using the negative medium, any non-uniformity in the negative is accentuated in the print film medium, due to the relatively high gamma of the print film, thereby causing undesirable imaging artifacts. If, however, modulator and optical components are suitably adjusted to reduce printer contrast to match the exposure range for the high gamma print film, the amplitude of non-uniformity due to the LCD is diminished. Thus, although even slight non-uniformity will be amplified due to the high gamma of the print film, the overall impact of the image artifact is reduced. In order to better understand the solution of the present invention for minimizing non-uniformity effects and how this solution works in cooperation with the modification of device setup voltages, it is first useful to review the overall arrangement of components employed in a digital image printing apparatus.

Light Modulation Components

Figure 6A:
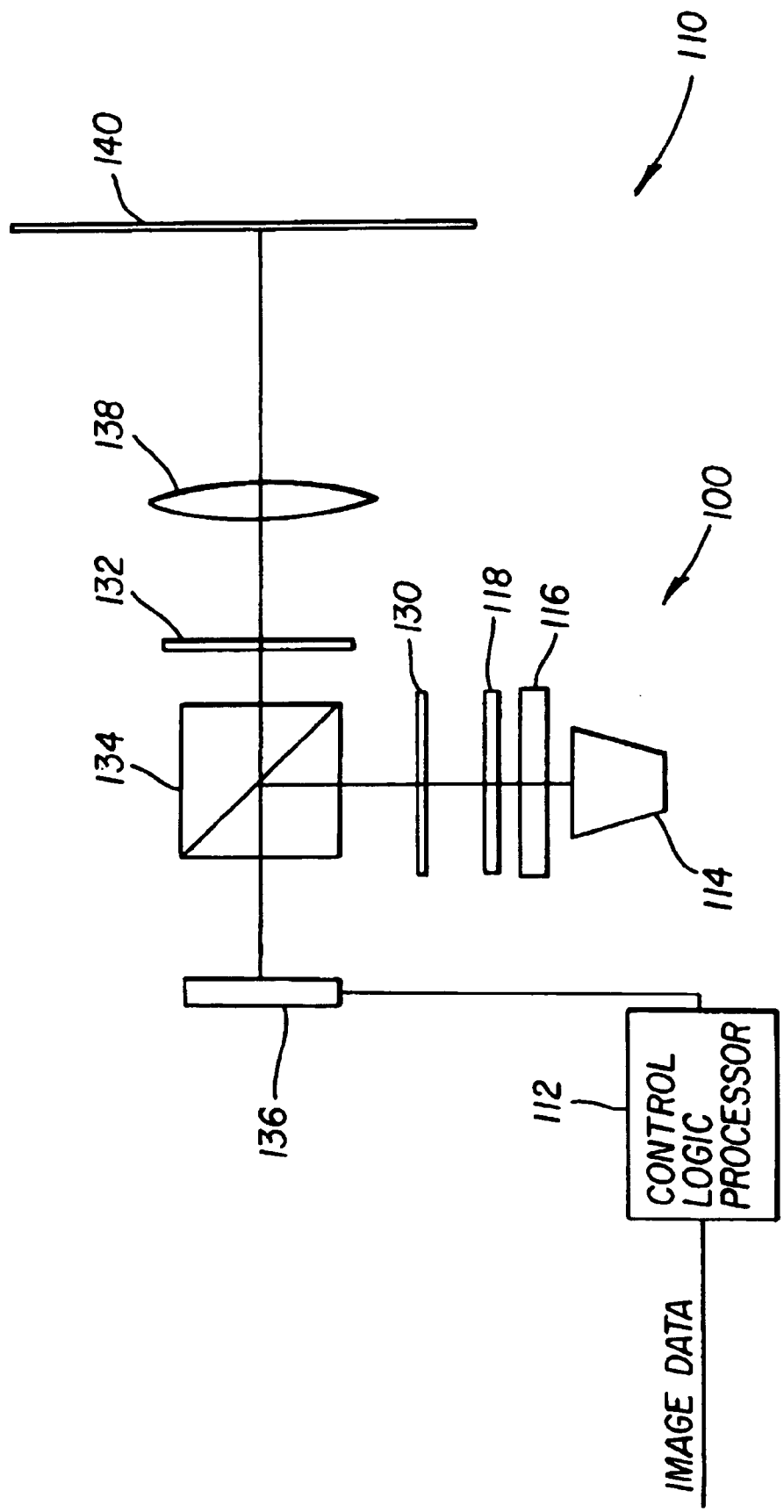
FIG. 6a is a block diagram showing a prior art arrangement of light modulation components for a single color channel.

Referring to FIG. 6a, there is shown a prior art printing apparatus 110 with an image generation apparatus 100 for a single color channel. A light source 114, such as a lamp with an optional color filter 118 or one or more LEDs, provides source illumination through a uniformizer 116 to a polarizing beamsplitter 134. Polarizing beamsplitter 134 directs illumination having the desired polarization state to a spatial light modulator 136. A control logic processor 112 accepts digital image data and uses that data in order to modulate spatial light modulator 136 for forming an image. Modulated light bearing this image then passes through polarizing beamsplitter 134, then through an analyzer 132, and is directed by a lens 138 onto a photosensitive medium 140. Polarizing beamsplitter 134 used in prior art embodiments is conventionally based on a prism arrangement, such as a MacNeille prism, for example.

The prior art arrangement of FIG. 6a is suitable for imaging onto photosensitive media 140 of a specific type, having specific contrast response characteristics. However, the component arrangement of FIG. 6a is not readily adaptable for imaging onto photosensitive media 140 having different contrast response characteristics. That is, once the component arrangement of FIG. 6a is optimized for the contrast ratio of a specific photosensitive medium 140, there is little or no option for adjustment for an alternate photosensitive medium 140.

Figure 7A:
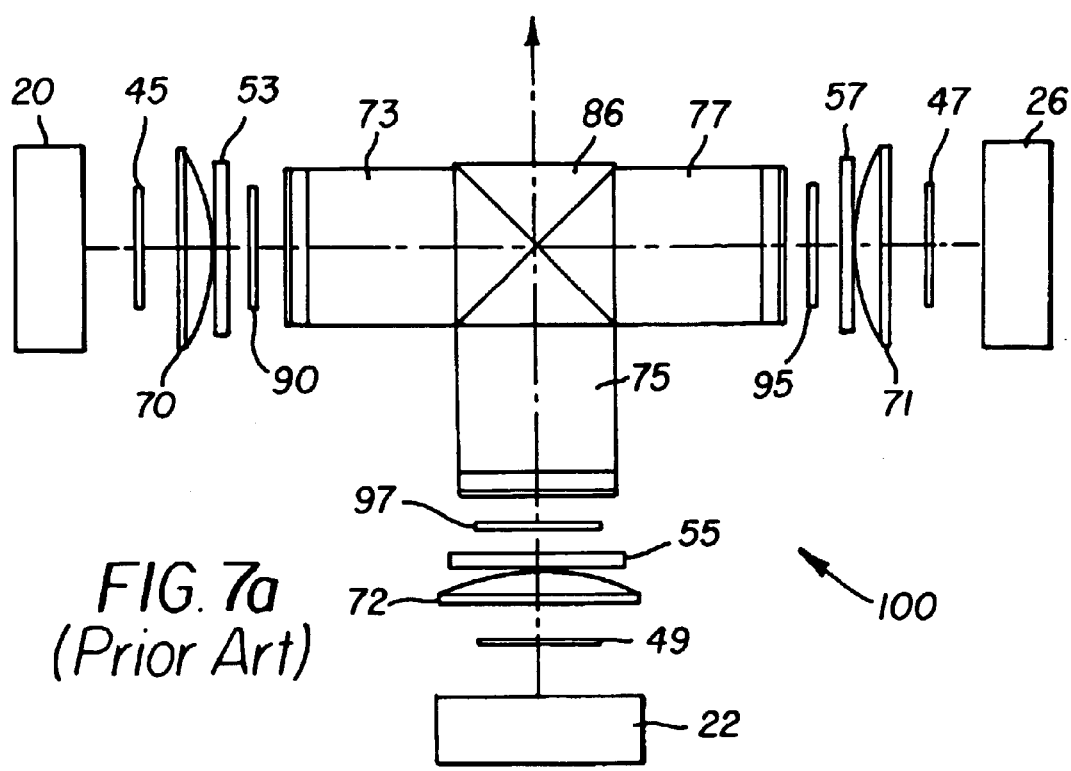
FIGS. 7a–7d show plane and perspective views of image forming components in a multicolor embodiment.
Figure 7B:
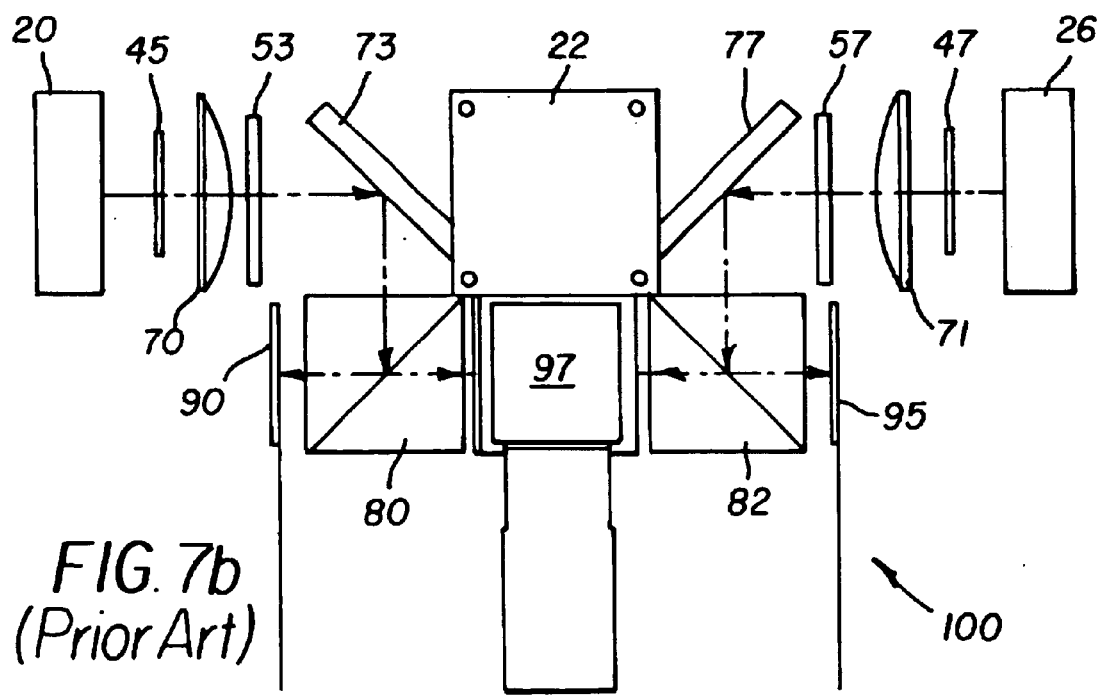
Figure 7C:
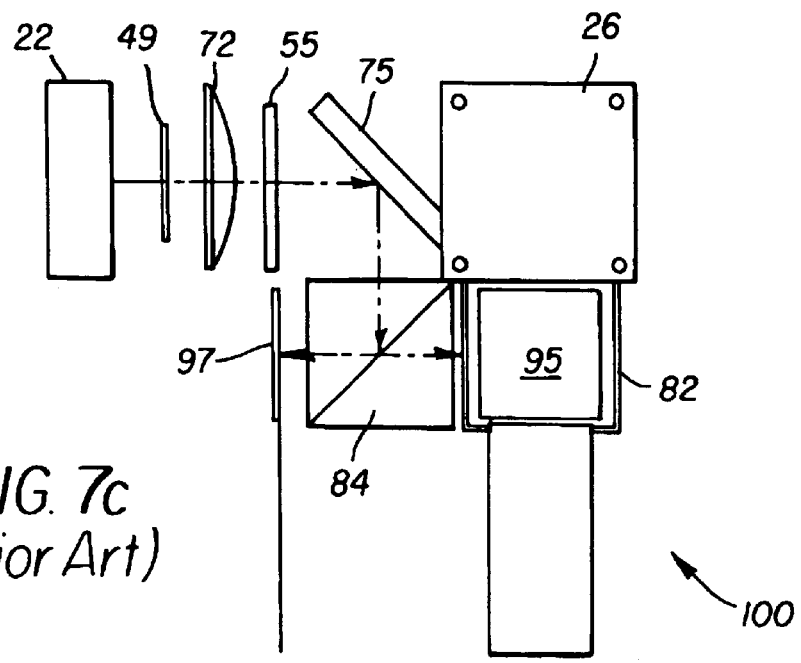
Figure 7D:
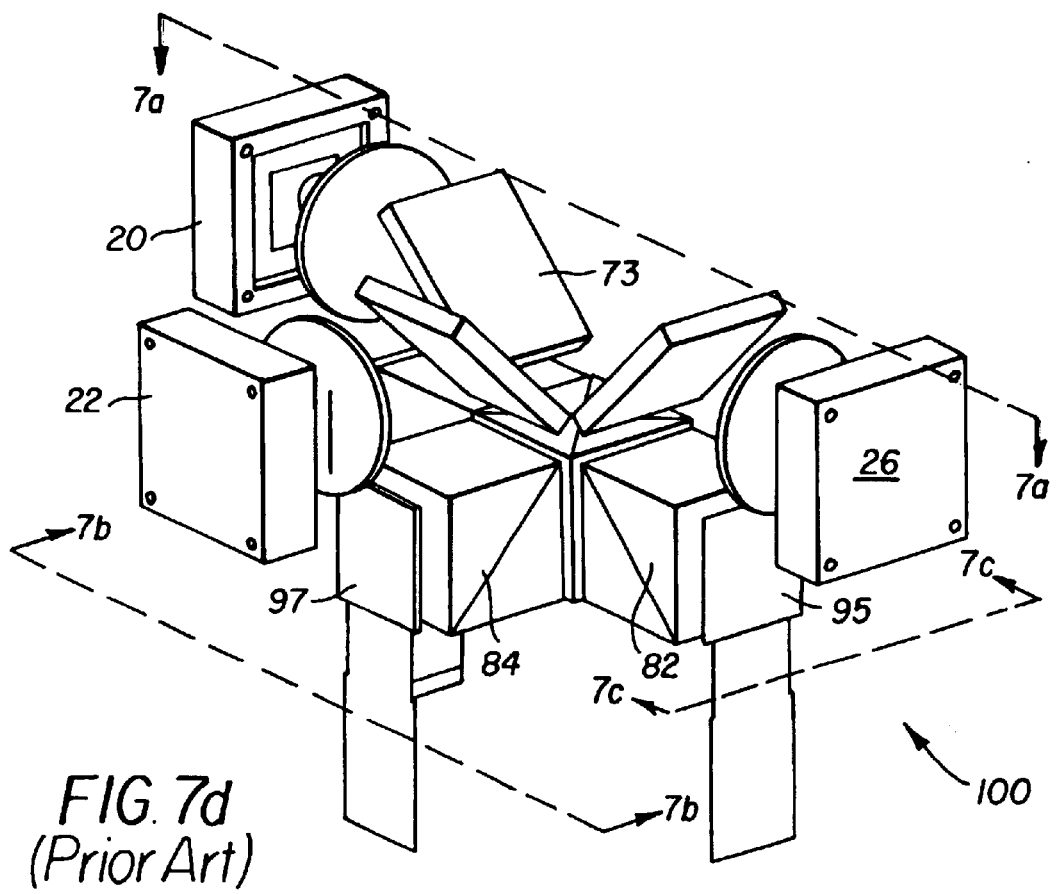

Referring to FIGS. 7a, 7b, 7c, and 7d, there are shown schematic and perspective views of image generation apparatus 100 of printing apparatus 110 in a prior art embodiment using a separate light source and spatial light modulator for each color. Referring particularly to FIGS. 7a, 7b, and 7c, light sources 20, 22, and 26 direct light (typically red, green, and blue light) through uniformizing optics 45, 49, and 47; through telecentric condenser lenses 70, 72, and 71; through polarizers 53, 55, and 57; through folding mirrors 73, 75, 77; through polarizing beamsplitters 80, 84, and 82; to reflective spatial light modulators 90, 97, and 95 respectively. Modulated light is transmitted through polarizing beamsplitters 80, 84, and 82 to an X-cube combiner 86, which combines the separately modulated color beams along an output axis for writing. FIG. 7d shows one example for spatial positioning of these illumination and modulation components as image generation apparatus 100.

In the arrangement shown in FIGS. 7a, 7b, 7c, and 7d, light sources 20, 22, and 26 each typically comprise an LED array or lamp with optional color filter (not shown). Spatial light modulators 90, 97, and 95 are reflective LCDs. The arrangement of FIGS. 7a, 7b, 7c, and 7d allows simultaneous RGB exposure of photosensitive medium 140. Because this design allows maximum power for each color and simultaneous writing of colors, writing speed is maximized when using this arrangement.

Adjustment for Non-uniformity Compensation

In the prior art image generation apparatus 100 of FIGS. 6a and 7a–d, a conventional design goal is to maximize contrast. In order to achieve maximum contrast, polarization components, specifically polarizer 130 and analyzer 132 in FIG. 6a and polarizers 53, 55, and 57 in FIGS. 7a–7d, and polarizing beamsplitter 134 in FIG. 6a and polarizing beamsplitters 80, 84, and 82 in FIGS. 7a–7d, are finely adjusted relative to each other in the modulation path. Once a suitable adjustment for the highest available contrast has been achieved, the polarization components are fixed in place.

It has been observed, however, that slight rotation of polarizing beamsplitter 134 in FIG. 6a reduces the low frequency non-uniformity of reflective spatial light modulator 136. Where polarizing beamsplitter 134 is a conventional prism-based beamsplitter, such rotation would be impractical, requiring corresponding adjustment of numerous supporting components in the illumination and modulation path. However, for a printing apparatus 110 employing a wire grid polarizing beamsplitter, rotation of such a device about its center point and within the same plane would allow a change to contrast, without impact on other supporting optical components.

Apparatus Allowing Contrast Adjustment

Figure 6B:
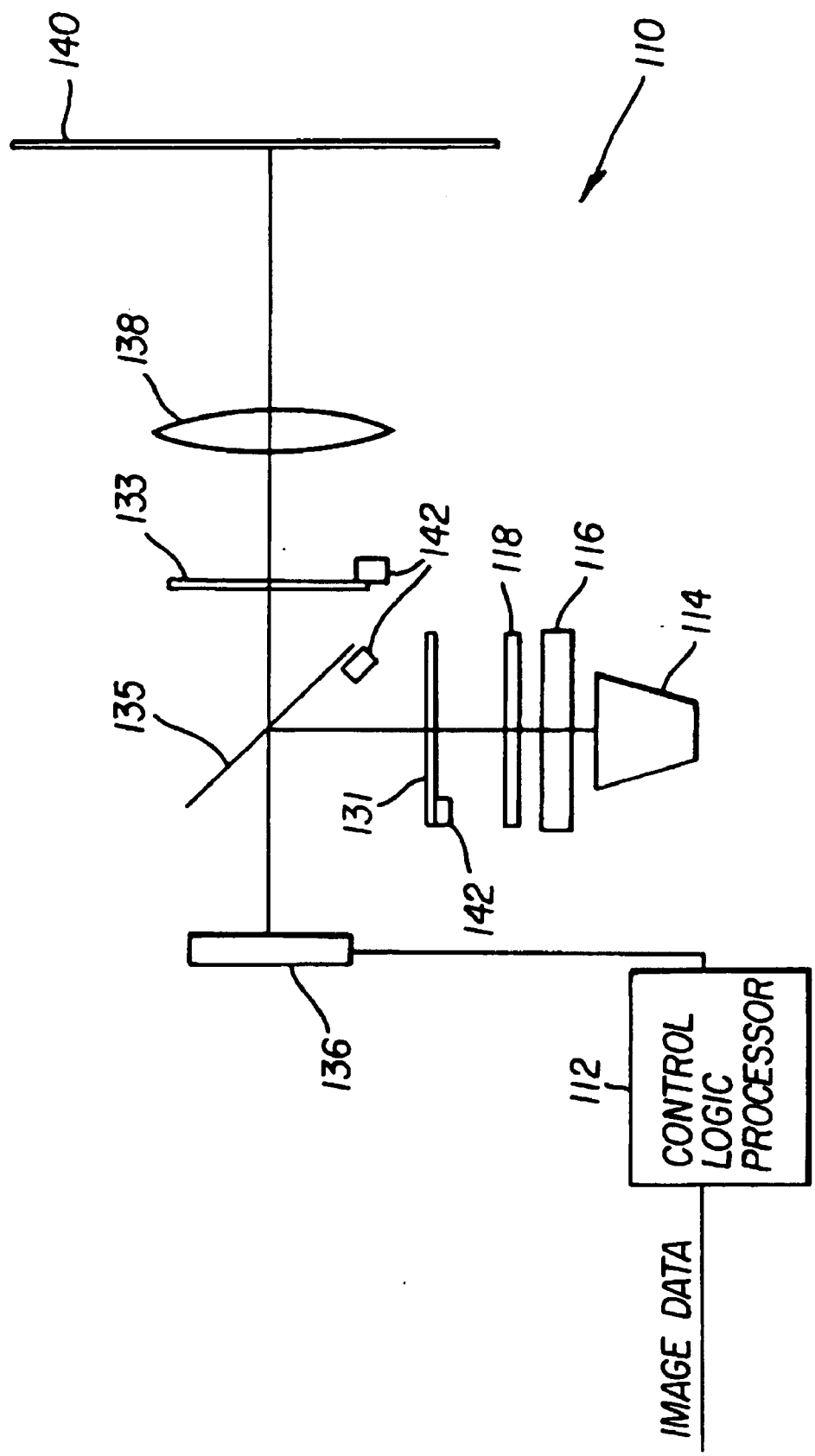
FIG. 6b is a block diagram showing an arrangement of light modulation components in one embodiment of the present invention.

Referring to FIG. 6b, there is shown printing apparatus 110 adapted using polarization state adjustment for imaging onto two or more different types of photosensitive medium 140, where these media 140 differ in contrast response characteristics. Adapted components for this embodiment include one or more of the following:

(a) an adjustable wire grid polarization beamsplitter 135, such as those commercially available from Moxtek, Inc., Orem, Utah and described in U.S. Pat. Nos. 6,122,103 and 6,288,840 (Perkins et al.), and 6,243,199 (Hansen et al.), capable of being rotated or repositioned to change polarization effects on incident light;

(b) an adjustable analyzer 133, similarly capable of being rotated or repositioned to change polarization effects on incident light;

(c) an adjustable polarizer 131, similarly capable of being rotated or repositioned to change polarization effects on incident light; and (d) one or more optional adjustment mechanisms 142 for adjusting the rotation or position of one or more of adjustable polarizer 131, adjustable analyzer 133, or wire grid polarizing beamsplitter 135 in order to adjust polarization characteristics, where adjustment mechanisms 142 may allow manual adjustment, such as using a tab or adjustment screw, or may allow automatic adjustment under control of control logic processor 112, such as a piezoelectric actuator or a stepper motor or other type of motor, solenoid, or other drive device, for example.

The apparatus of FIGS. 7a–7d can be converted to adapt each color modulation channel for polarization adjustment using the arrangement shown in FIG. 6b. This conversion can be effected by replacing the three polarization beamsplitter prisms 80, 82, and 84 with adjustable wire grid polarization beamsplitters 135, with corresponding adjustments to adjustable polarizer 131 and analyzer 133, as would be well known in the imaging arts.

As wire grid polarizing beamsplitter 135 is rotated from its maximum contrast orientation, the contrast ratio of printing apparatus 110, measurable using a photodetector at the film plane, drops correspondingly. However, at the same time, the amplitude of non-uniformity artifacts also decreases. Thus, if a large exposure contrast ratio is not needed, some of the excess contrast ratio can be reduced in order to expose a more uniform image. Making this adjustment alters the effective EO curve for spatial light modulator 136, as shown in FIG. 4, even though setup voltages Vc and V1 are unchanged. Empirical results show that the two effects, electro-optical and optical, are inextricably linked together in providing EO curve shape; one cannot measure the EO curve without also including the effects of contrast. It is important to note that the polarized input beam is aligned with respect to wire grid polarizing beamsplitter 135. Rotating wire grid polarizing beamsplitter 135 in order to reduce contrast disrupts this alignment, thereby reducing overall illumination efficiency. Thus, by making polarizer 131 adjustable, the apparatus of the present invention allows re-alignment of the polarized input beam, restoring illumination efficiency to a higher level, without impact on the overall system contrast. With reference to the component arrangement of FIG. 6b, the relative alignment of spatial light modulator 136, wire grid polarizing beamsplitter 135, and adjustable analyzer 133 affects the overall contrast. The adjustment of polarizer 131 relative to wire grid polarizing beamsplitter 135 affects illumination brightness.

The relative characteristics of low- and high-contrast media and their roles in the conventional print film preparation workflow were described previously with reference to FIG. 1. The apparatus and method of the present invention provide a workflow capable of being employed directly for high-contrast print media, by making electrical and optical adjustments to an apparatus originally or primarily designed for printing onto low-contrast media.

Figure 5C:
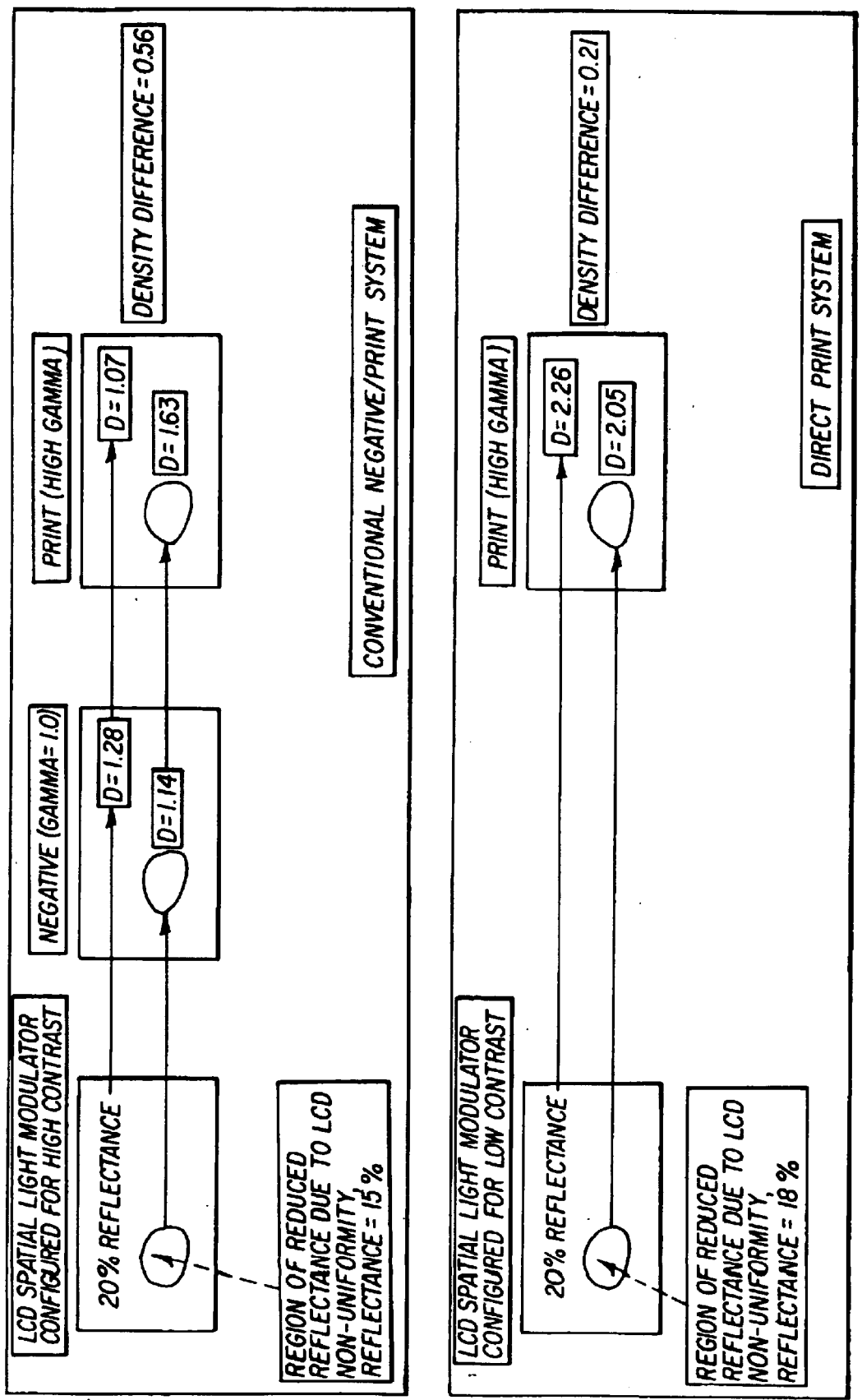
FIG. 5c shows how a reflectance difference caused by non-uniformity in the spatial light modulator is translated into a density difference on the print film. The amount of non-uniformity and the amount of density difference is shown for a negative to print system and for a direct to print system.

It is instructive to note that the apparatus and methods of the present invention provide unanticipated results in improved uniformity over the conventional print film printing workflow. Even with the high gamma characteristics of print film, LCD-induced artifacts on the print film have been found to be even less visible than with the conventional two step (negative/positive) process of FIG. 1, under some conditions, using the methods and apparatus of the present invention. Referring to FIG. 5c, there is shown a comparison of non-uniformity effects for the conventional negative/print system (along the top of FIG. 5c) with the results of a direct print system providing digital imaging using a spatial light modulator, as shown in FIG. 6b. For the example of FIG. 5c, an LCD used to image onto a negative medium is set to an overall uniform reflectance of 20%. However, due to device non-uniformities, a region exists within the LCD that has a lower reflectance than the remainder of the device. With the wire grid beamsplitter adjusted to produce the high contrast required to print on the intermediate negative film medium, this region may exhibit a reflectance of only 15%. During calibration of the film writer, exposure is adjusted such that when the LCD is at maximum reflectance, the film is exposed to produce its maximum density, Dmax. At 20% reflectance, the LCD exposes the intermediate negative film to produce a density of 1.28; however, the region of reduced reflectance produces a density of only 1.14, a density change of 0.14. When this negative film is then used for printing onto print film, the print film's gamma magnifies this density variation to 0.56, a 4:1 increase. If, however, wire grid polarizing beamsplitter 135 is adjusted to a lower contrast position for direct imaging onto print film, the lower contrast setting also results in reduced uniformity deviation. For example, again with the LCD modulator driven to an overall uniform reflectance of 20%, the region of non-uniformity may exhibit a reflectance of 18%, as is shown in the lower portion of FIG. 5c. As done previously with the intermediate negative film, the film writer's exposure is adjusted to produce Dmax on the print film when the LCD modulator is at maximum reflectance. At 20% reflectance, a density of 2.26 would be achieved on the film. At 18% reflectance, a density of 2.05 would be obtained. The density change due to LCD non-uniformity in this direct printing case is only 0.21, versus 0.56 for the conventional negative/positive printing system. Since the visibility of a non-uniform aberration is closely linked to the change in density, the visibility of the non-uniformity is about 2.5 times lower for the direct print digital imaging system of the present invention than for the conventional negative/positive system. Thus, the direct printing system can produce images using the full density range of the print film (as does the conventional negative/positive printing system), but, contrary to expectations, with reduced artifacts relative to the conventional system.

While rotation of wire grid polarizing beamsplitter 135 provides the simplest adjustment, the contrast ratio can alternately be reduced by rotating analyzer 132. As one alternative, a combination of rotating wire grid beamsplitter 135 and adjustable analyzer 133 can be employed using the configuration of FIG. 6b. The contrast of the EO curve, as shown in FIG. 4, can be increased with changes to the electrical setup parameters for the spatial light modulator, with the overall system contrast then reduced by rotating wire grid polarizing beamsplitter 135. Repeated iterations, adjustment followed by measurements, may be necessary until an acceptable or optimum solution is reached. Using this method, the best solution for a specific type of photosensitive medium requires an assessment of results from this trade-off of contrast for uniformity.

Setup Procedure for Specific Photosensitive Medium 140 Type

Figure 8:
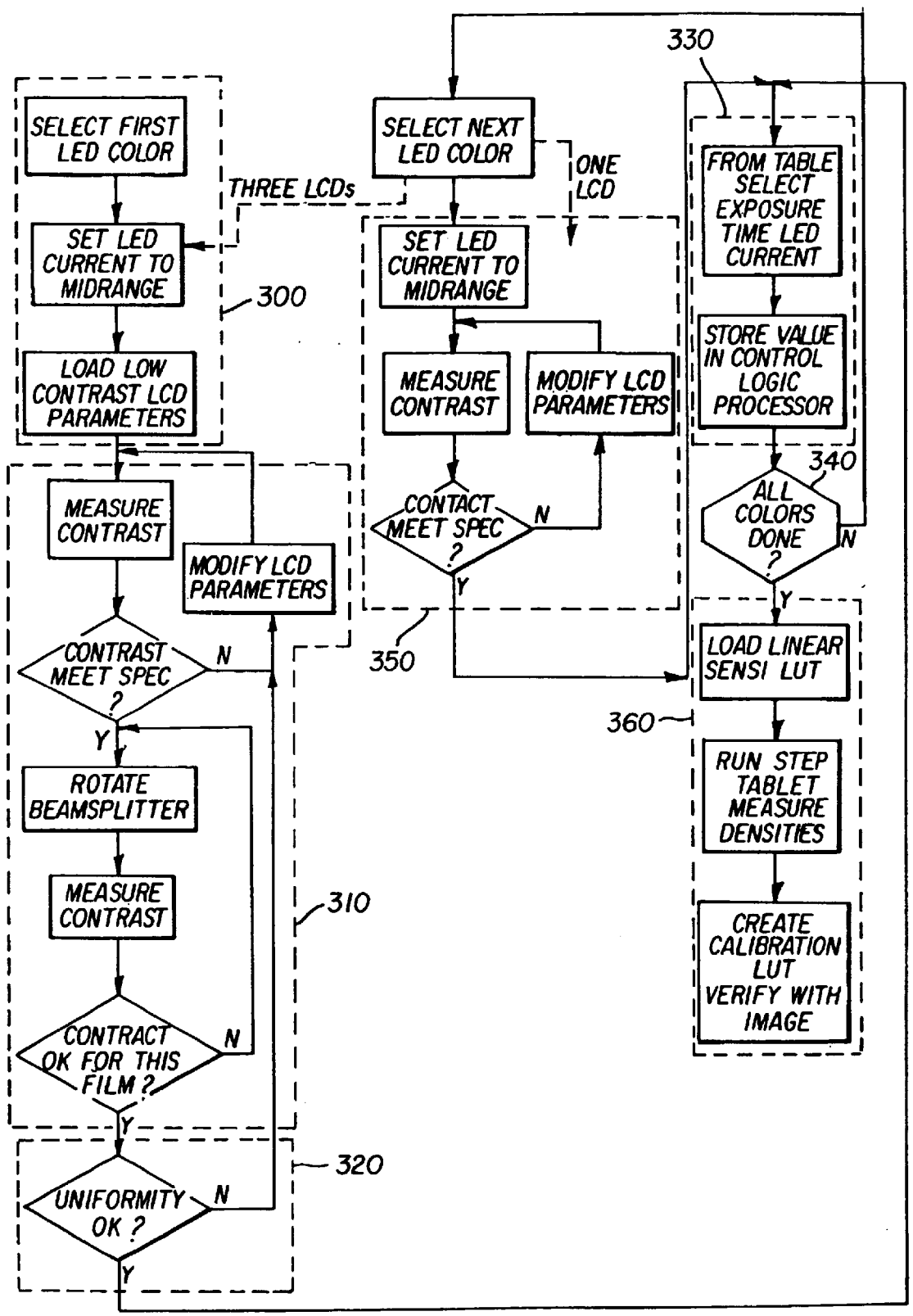
FIG. 8 gives a flow diagram of the major steps for setting setup voltage conditions for a specific photosensitive medium.

Referring to FIG. 8, the procedure for matching printing apparatus 110 to the contrast response characteristics of photosensitive medium 140 includes an initial factory setup for printing apparatus 110, followed by a setup procedure for each specific photosensitive medium 140. This procedure, typically provided for a particular analog reflective LCD, can be readily adapted by one skilled in the art to other digital and analog LCDs and to any spatial light modulator that modulates light polarization. The procedure described in FIG. 8 assumes that the printing apparatus 110 optics are set up for maximum contrast (with polarizer 130 and analyzer 132 configured as crossed polarizers and with wire grid polarizing beamsplitter 135 suitably adjusted) and that nominal LCD voltage setup parameters for a high contrast EO curve have been loaded to control LCD spatial light modulator 136. These nominal voltages should be available from offline testing of LCD devices of the type used. With such a starting point, the contrast of the system should then meet or exceed the maximum contrast needed for writing on any of the intended photosensitive media 140.

Following initial setup, the configuration of printing apparatus 110 for each specific type of photosensitive medium 140 can be carried out, using the steps shown in FIG. 8. A setup step 300 is first executed, with the following substeps:

1. Select an illumination color.
2. Set illumination brightness/current to a midrange value.
3. Load nominal low contrast LCD setup parameters.

Next, a contrast measurement and adjustment step 310 is performed, with the following substeps:

4. Measure contrast.
5. Determine if contrast is acceptable.

If yes, continue to the next substep. If no, modify LCD parameters and go back to substep 4.

6. Adjust polarization component rotation until desired contrast ratio is achieved. This adjustment can be performed, for example, by rotating either or both wire grid polarizing beamsplitter 135 and adjustable analyzer 133.

7. Measure contrast.
8. Determine if contrast is acceptable for this medium. If yes, continue to the next substep. If no, modify LCD parameters and return to substep 4.

A uniformity assessment step 320 follows, with these substeps:

9. Determine if uniformity is acceptable. If yes, proceed to the next substep. If no, modify LCD parameters to increase LCD EO contrast and return to substep 4.

A setup value storage step 330 can then be executed for storage of setup parameters that obtained acceptable uniformity results, using the following substeps:

10. From a table of empirically developed values for printing apparatus 110, select the exposure time and LED current needed to obtain Dmax.
11. Store values in control logic processor 112: LCD parameters (Vc, V1, V2, video level), exposure time, LED current or light source settings, wire grid polarizing beamsplitter 135 rotation or analyzer 132 rotation. This may entail, for example, counting pulses of a stepper motor drive or other type of adjustment mechanism 142 to move it from its home position to the position corresponding to each desired contrast ratio and loading the results into control logic processor 112.

A decision step 340 checks for the need to repeat this procedure for additional colors:

12. Determine if all colors are done. If yes, looping is complete; proceed to substep 20. If not, return to substep 2 in setup step 300 if this is a three LCD modulator system, as shown in FIG. 7. For a single LCD system, as in FIG. 6b, go to substep 13.

A contrast measurement and adjustment step 350 is then performed for each additional color, with the following substeps:

13. Select the next illumination color.
14. Set brightness/current to midrange value.
15. Measure contrast.
16. Determine if contrast is within allowable specifications. If yes, continue with the next substep. If not, modify LCD parameters and return to substep 15. (With a single LCD system, do not rotate wire grid polarizing beamsplitter 136 or analyzer 132, since this has already been set with the first color.)

Setup value storage step 330 is repeated, with the following substeps:

17. From a table of empirically determined values, select the exposure time and LED current needed to obtain Dmax.
18. Store values in control logic processor 112. LCD parameters (Vc, V1, V2, video level), exposure time, LED current or light source settings, PBS or analyzer rotation.
19. Check to see if all colors are done. If yes, continue with the next substep. If no, return to substep 2 for a three modulator system, or to substep 13 for a single modulator system.

A calibration step 360 is then performed, with the following substeps:

20. Employ a linear LUT such that control logic processor 112 applies no correction for nonlinearity of spatial light modulator 136 or photosensitive medium 140.
21. Run a sensitometric test at known code values and power levels (step tablet), for example, using 22 levels. Expose test strips of photosensitive medium 140 at these levels. Then, develop the test strip and measure density.
22. Create a non-linear calibration LUT using the sensitometric data from substep 21, such that equal code value increments result in equal density increments on the processed photosensitive medium.
23. Load the calibration LUT.
24. Write a verification image.

Ideally, printing apparatus 10 is set up at the factory, with presets loaded for each photosensitive medium 140 type, including voltage settings (V1, V2, video level, and Vc) and wire grid polarizing beamsplitter 135 and adjustable analyzer 133 rotations.

Using the method of the present invention, printing apparatus 110 can be set up for use with any number of different types of photosensitive media 140 having a range of contrast characteristics. Setup for each different type of photosensitive medium 140 can be performed using a combination of operator-entered commands and manual adjustments, so that suitable voltage levels are set and polarization component adjustments are made for the specific type of photosensitive medium 140. Alternately, the setup adjustments could be partially or fully automated, with automatic sensing of type of photosensitive medium 140 and automated adjustment of polarization component rotation, using a motor, solenoid, piezoelectric component, or other type of controlled actuator for adjustment mechanism 142 in FIG. 6b, for example. In one automated sensing embodiment, a film cartridge or other package containing photosensitive medium 140 can have, as an indicator, an RF ID device (not shown), such as a TAG-IT transponder, manufactured by Texas Instruments, Inc., Dallas, Tex., with an RF transceiver (not shown) used as a sensor. The sensor would detect the type of photosensitive medium 140 loaded into printing apparatus 10 and would run through an initialization routine appropriate for that photosensitive medium 140 type. The values for the initialization can be determined at the factory and loaded into a memory on control logic processor 112. With automatic sensing, the adjustment process performed can be made entirely automatic and can be transparent to the operator. Any minor week-to-week variations can be compensated for, using periodic calibration of printing apparatus 110. Other types of sensor and indicator combinations could be used, such as a bar code reader for sensing a bar code label indicator on photosensitive medium 140 or on media packaging or a magnetic strip reader for sensing a magnetic encoding on photosensitive medium 140 or on media packaging, for example.

The invention has been described in detail with particular reference to certain preferred embodiments thereof, but it will be understood that variations and modifications can be effected within the scope of the invention as described above, and as noted in the appended claims, by a person of ordinary skill in the art without departing from the scope of the invention. For example, the apparatus and methods of the present invention could be employed for adaptation to any of a set of different types of photosensitive media 140 having different contrast response characteristics. This set could have two or more member types of photosensitive media 140, so that image generation apparatus 100 could have settings for a corresponding number of types of photosensitive media 140.

Thus, what is provided is a printing apparatus and method for recording images onto a photosensitive medium, capable of adapting to the contrast sensitivity characteristics of the photosensitive medium.

PARTS LIST

20 Light source
22 Light source
26 Light source
45 Uniformizing optics
47 Uniformizing optics
49 Uniformizing optics
53 Polarizer
55 Polarizer
57 Polarizer
70 Condenser lens
71 Condenser lens
72 Condenser lens
73 Folding mirror
75 Folding mirror
77 Folding mirror
80 Polarizing beamsplitter
82 Polarizing beamsplitter
84 Polarizing beamsplitter
86 X-cube combiner
90 Spatial light modulator
95 Spatial light modulator
97 Spatial light modulator
100 Image generation apparatus
110 Printing apparatus
112 Control logic processor
114 Light source
116 Uniformizing optics
118 Color filter
120 Contact printer
122 Master negative film
124 Unimaged print film
124' Exposed print film
126 Printhead
130 Polarizer
131 Adjustable polarizer
132 Analyzer
133 Adjustable analyzer
134 Polarizing beamsplitter
135 Wire grid polarizing beamsplitter
136 Spatial light modulator
138 Lens
140 Photosensitive medium
142 Adjustment mechanism
200 Low contrast curve
210 High contrast curve
300 Setup step
310 Contrast measurement and adjustment step
320 Uniformity assessment step
330 Setup value storage step
340 Decision step
350 Contrast measurement and adjustment
360 Calibration step

What is claimed is:

1. A printing apparatus for selectively printing an image from image data onto any member of a set of photosensitive media, wherein said set comprises at least a first photosensitive medium and a second photosensitive medium, wherein said first photosensitive medium has a relatively low contrast response with respect to said second photosensitive medium, the apparatus comprising:

(a) a spatial light modulator for forming an image by modulating a polarization state of an incident light according to said image data, said spatial light modulator having at least a first set of setup voltage conditions for printing onto said first photosensitive medium and a second set of setup voltage conditions for printing onto said second photosensitive medium;

(b) an adjustable polarizing component in the path of output light from said spatial light modulator, said adjustable polarizing component having at least a first contrast setting for said first photosensitive medium and a second contrast setting for said second photosensitive medium; and (c) a control logic processor for selectively setting at least said first set of setup voltage conditions for said first photosensitive medium and said second set of setup voltage conditions for said second photosensitive medium.

2. A printing apparatus according to claim 1 wherein said adjustable polarizing component is a polarizing beamsplitter.

3. A printing apparatus according to claim 2 wherein said adjustable polarizing beamsplitter is a wire grid polarizing beamsplitter.

4. A printing apparatus according to claim 1 wherein said adjustable polarizing component is an analyzer.

5. A printing apparatus according to claim 1 further comprising an actuator for adjusting said adjustable polarizing component, wherein said control logic processor controls the operation of said actuator.

6. A printing apparatus according to claim 2 wherein said actuator is from the group consisting of a solenoid, a piezo-electric device, and a motor.

7. A printing apparatus according to claim 1 wherein said incident light is provided from at least one LED.

8. A printing apparatus according to claim 1 wherein said spatial light modulator is taken from the group consisting of a reflective LCD and a transmissive LCD.

9. A printing apparatus according to claim 1 wherein the light level provided from each pixel in said spatial light modulator is controlled by a digital value.

10. A printing apparatus according to claim 1 wherein the light level provided from each pixel in said spatial light modulator is controlled by an analog voltage.

11. A printing apparatus according to claim 1 wherein said spatial light modulator provides a single color image.

12. A printing apparatus according to claim 1 wherein said spatial light modulator provides a multicolor image.

13. A printing apparatus according to claim 1 further comprising a sensor in communication with said control logic processor for detecting a type of photosensitive medium.

14. A printing apparatus according to claim 12 wherein said sensor is a transceiver.

15. A printing apparatus according to claim 12 wherein said sensor is a bar code reader.

16. A printing apparatus according to claim 12 wherein said sensor is a magnetic strip reader.

17. A printing apparatus according to claim 1 wherein said adjustable polarizing component is manually adjustable.

18. A printing apparatus for selectively printing an image from image data onto any member of a set of photosensitive media, wherein said set comprises at least a first photosensitive medium and a second photosensitive medium, wherein said first photosensitive medium has a relatively low contrast response with respect to said second photosensitive medium, the apparatus comprising:

(a) a spatial light modulator for forming an image by modulating a polarization state of an incident light according to the image data, said spatial light modulator having at least a first set of setup voltage conditions for printing onto said first photosensitive medium and a second set of setup voltage conditions for printing onto said second photosensitive medium;

(b) a polarizing beamsplitter for receiving light from an illumination source and directing said incident light having said polarization state toward said spatial light modulator;

(c) an adjustable polarizing component in the path of output light from said spatial light modulator, said adjustable polarizing component having at least a first contrast setting for said first photosensitive medium and a second contrast setting for said second photosensitive medium; and (d) a control logic processor for selectively setting at least said first set of setup voltage conditions for said first photosensitive medium and said second set of setup voltage conditions for said second photosensitive medium.

19. A printing apparatus according to claim 18 further comprising an actuator for adjusting said adjustable polarizing component, wherein said control logic processor controls the operation of said actuator.

20. A printing apparatus according to claim 19 wherein said actuator is from the group consisting of a solenoid, a piezo-electric device, and a motor.

21. A printing apparatus according to claim 18 wherein said polarizing beamsplitter is a wire grid beamsplitter.

22. A printing apparatus according to claim 18 wherein said incident light is provided from at least one LED.

23. A printing apparatus according to claim 18 wherein said spatial light modulator is taken from the group consisting of a reflective LCD and a transmissive LCD.

24. A printing apparatus according to claim 18 wherein the light level provided from each pixel in said spatial light modulator is controlled by a digital value.

25. A printing apparatus according to claim 18 wherein the light level provided from each pixel in said spatial light modulator is controlled by an analog voltage.

26. A printing apparatus according to claim 18 wherein said polarizing beamsplitter is adjustable for contrast.

27. A printing apparatus according to claim 18 wherein said spatial light modulator provides a single color image.

28. A printing apparatus according to claim 18 wherein said spatial light modulator provides a multicolor image.

29. A printing apparatus according to claim 18 further comprising a sensor in communication with said control logic processor for detecting a type of photosensitive medium.

30. A printing apparatus according to claim 29 wherein said sensor is taken from the group consisting of a transceiver, a bar code reader, and a magnetic strip reader.

31. A printing apparatus according to claim 18 wherein said adjustable polarizing component is an analyzer.

32. A printing apparatus according to claim 26 wherein said adjustable polarizing component comprises an analyzer, and wherein both said polarizing beamsplitter and said analyzer are adjusted for contrast.

33. A printing apparatus according to claim 26 wherein said polarizing beamsplitter is manually adjustable.

34. A method for printing an image from image data onto a photosensitive medium having a predetermined contrast response, comprising:

(a) setting voltage conditions for a spatial light modulator, based on the contrast response of the photosensitive medium;

(b) adjusting at least one polarization component to adjust the contrast of imaging optics according to the predetermined contrast response of the photosensitive medium;

(c) directing an incident light having a predetermined polarization state toward a spatial light modulator;

(d) modulating said incident light according to the image data in order to form a modulated image-bearing beam; and (e) directing said modulated image-bearing beam toward the photosensitive medium.

35. A method for printing an image according to claim 34 wherein the step of setting voltage conditions comprises the step of setting a video voltage range.

36. A method for printing an image according to claim 34 wherein the step of adjusting at least one polarization component comprises the step of making a manual adjustment.

37. A method for printing an image according to claim 34 wherein the step of adjusting at least one polarization component comprises the step of energizing an actuator.

38. A method for printing an image according to claim 34 wherein the step of adjusting at least one polarization component comprises the step of rotating a wire grid polarizing beamsplitter.

39. A method for printing an image according to claim 34 wherein the step of modulating said incident light comprises the step of controlling a liquid crystal device.

40. A method for printing an image according to claim 37 wherein the step of energizing an actuator comprises the step of driving a motor.

41. A method for printing an image according to claim 37 wherein the step of energizing an actuator comprises the step of energizing a piezoelectric actuator.

42. A method for printing an image according to claim 37 wherein the step of energizing an actuator comprises the step of energizing a solenoid.

43. A method for printing an image according to claim 34 wherein the step of adjusting polarization components comprises the step of rotating an analyzer.

44. A method for printing an image according to claim 34 wherein the step of adjusting polarization components comprises:

(a) rotating a polarizing beamsplitter; and (b) rotating an analyzer.

45. A method for matching the exposure characteristics of a printing apparatus that modulates polarized source illumination using a spatial light modulator, with contrast characteristics of a photosensitive medium for a color, the method comprising:

(a) providing initial setup voltages suitable for a low-contrast photosensitive medium;

(b) reducing the contrast ratio of the printing apparatus by rotating at least one polarization component in the path of modulated light;

(c) generating a test print to assess output uniformity; and (d) storing setup voltage and polarization rotation conditions for use with the photosensitive medium.

46. A method for matching the exposure characteristics according to claim 45 wherein the step of reducing the contrast ratio of the printing apparatus further comprises the step of rotating an analyzer.

47. A method for matching the exposure characteristics according to claim 45 wherein the step of reducing the contrast ratio of the printing apparatus further comprises the step of rotating a polarizing beamsplitter.

* * * * *